United States Patent

Shaw

[11] Patent Number: 5,174,905
[45] Date of Patent: Dec. 29, 1992

[54] APPARATUS AND METHOD FOR TREATING WATER WITH OZONE

[76] Inventor: Donald Shaw, 9311 Ferndale Place, Richmond, Canada, V6Y 1X4

[21] Appl. No.: 872,313

[22] Filed: Apr. 23, 1992

[51] Int. Cl.⁵ ............................................... C02F 1/78
[52] U.S. Cl. .................................. 210/760; 210/192; 210/198.1
[58] Field of Search ............ 210/760, 748, 192, 198.1

[56] References Cited

U.S. PATENT DOCUMENTS

| | | | |
|---|---|---|---|
| 3,510,265 | 5/1970 | Kawahata | 210/192 |
| 3,562,349 | 2/1971 | Pawloski | 261/36.1 |
| 3,805,481 | 4/1974 | Armstrong | 210/760 |
| 3,945,918 | 3/1976 | Kirk | 210/760 |
| 4,230,571 | 10/1980 | Dadd | 210/760 |
| 4,252,654 | 2/1981 | Leitzke et al. | 210/760 |
| 4,255,257 | 3/1981 | Greiner et al. | 210/760 |
| 4,595,498 | 6/1986 | Cohen et al. | 210/192 |
| 5,032,292 | 7/1991 | Conrad | 210/760 |
| 5,043,079 | 8/1991 | Hallett | 210/760 |
| 5,061,377 | 10/1991 | Lee et al. | 210/760 |
| 5,075,016 | 12/1991 | Barnes | 210/760 |
| 5,106,495 | 4/1992 | Hughes | 210/748 |

Primary Examiner—Stanley S. Silverman
Assistant Examiner—Cynthia L. Nessler
Attorney, Agent, or Firm—Norman M. Cameron

[57] ABSTRACT

An apparatus and method for treating water with ozone. An outer conduit forms a continuous, vertical loop. A pump is connected to the bottom of the loop and pumps water about the loop from the bottom towards a first side. An opening admits ozone into the outer conduit. There is an outlet for gases near the top of the loop. An inner conduit within the outer conduit is spaced - apart therefrom to form a passageway for water therebetween. The inner conduit has an inlet between the opening for ozone and the outlet for gases and an outlet within the outer conduit on the second side of the loop. Some of the water is diverted into the inlet of the inner conduit. A flow of water at reduced linear velocity is permitted through the passageway into the outer conduit. Ozone released at the outlet of the inner conduit flows upwardly through the outer conduit in counterflow to the water therein to increase the amount of ozone dissolved in the water.

14 Claims, 2 Drawing Sheets

APPARATUS AND METHOD FOR TREATING WATER WITH OZONE

BACKGROUND OF THE INVENTION

1. Field of the Invention

This invention relates to an apparatus and method for treating water with ozone, particularly for drinking water and ice making.

2. Description of Related Art

It has been well known for many years that water can be purified of harmful organisms by treating it with ozone. However, there is a problem in trying to dissolve ozone in the water to purify it and yet not discharge a significant portion of unreacted ozone from the water, thus wasting it and potentially creating a health hazard.

Four types of gas-liquid contactors have been used for this purpose including spray towers, where liquid is dispersed in a gas, packed beds, bubble plates or sieve towers, and finally units for dispersing gas bubbles in a liquid.

Many of the apparatuses have been designed for industrial purposes, but are not well adapted for use where a relatively compact unit is required for the continuous production of purified water, such as in association with an in-store ice maker or an in-home water purifier.

The use of loop reactors for processes involving liquids and gases has been suggested in such earlier references as U.S. Pat. No. 3,562,349 to Pawloski. In this reference, a pump circulates liquid about a closed loop with inlets and outlets including a gas outlet at the top of the unit.

U.S. Pat. No. 4,252,654 to Leitzke relates specifically to treating water with ozone. Here the water circulated about the loop is split into separate paths for treatment. Only a portion of the total flow of water is treated with ozone by one pass only about the loop. A packed column is employed with a portion of the water sprayed from the top.

Another apparatus for treating water with ozone by circulating it about a loop is shown in U.S. Pat. No. 3,945,918 to Kirk. There is a turbulent zone for mixing the water with ozone as well the setting up of a counterflow of ozone through the water.

However, none of these earlier devices or processes has yielded an efficient, compact apparatus or a process which has gained wide acceptance for purposes such as treating water for ice making or in-home water purification.

SUMMARY OF INVENTION

The invention addresses this problem by providing an apparatus for treating water with ozone which includes a first conduit and a pump connected to the first conduit. There is a passage for admitting ozone into the first conduit. A second conduit has an inlet connected to the first conduit and an outlet. A third conduit has a vertical portion extending upwardly adjacent the outlet of the second conduit. There is a passageway connecting the third conduit to the first conduit above the outlet of the second conduit. The passageway is sized to permit a reduced flow of water through the third conduit compared to the flow through the second conduit so ozone discharged from the outlet of the second conduit rises through the vertical portion of the third conduit to increase dissolving of the ozone in the water.

Preferably the apparatus forms a loop with a conduit extending from near the outlet of the second conduit to the pump.

Preferably there is an outlet for gas near the top of the loop.

In a preferred form of the invention, the second conduit is inside the third conduit.

The invention also provides a process for treating water with ozone. Water is circulated about a continuous loop of conduit. Ozone is admitted into the conduit and part of the ozonated water is diverted out of the conduit when required. Water is added to the conduit to make up for ozonated water so diverted.

Preferably, the conduit has a bifurcated portion, a first branch thereof having an open end and a second branch thereof having a vertical portion which extends about the open end of the first branch. Most of the water is circulated through the first branch with a smaller portion of the water being circulated through the second branch. Free ozone released at the open end of the first branch moves upwardly through the second branch in counterflow with the water therein.

DESCRIPTION OF THE PREFERRED EMBODIMENTS

Figure 1:
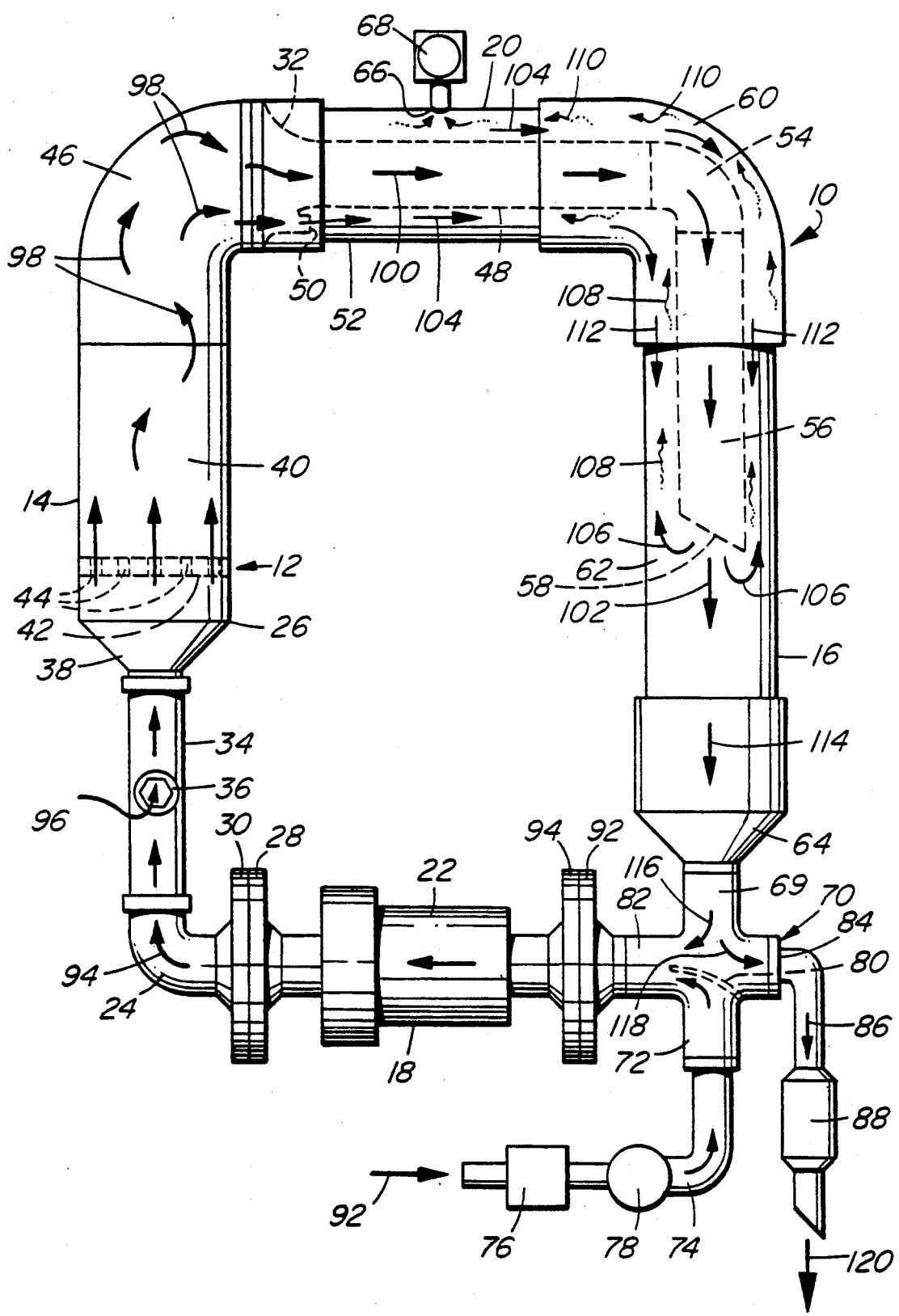
FIG. 1 is a diagrammatic side elevation of an apparatus for treating water with ozone and illustrating a method of treating water with ozone according to the invention.

Referring to the drawing, this illustrates an apparatus 10 for treating water with ozone. The apparatus is in the form of a continuous loop 12 and is made of a number of different conduits which are interconnected. Ozone resistant metal or plastic are suitable materials to use. Loop 12 has a first, vertical side 14, a second, vertical side 16, a horizontal bottom 18 and a horizontal top 20 in this preferred embodiment. Alternatively the bottom and/or top may be sloped. There is a circulator pump 22 at the bottom of the loop which is connected to elbow 24 of a first conduit 26 at flanges 28 and 30. a Grundfos UP-15-42SF pump is used in this example, but others resistant to corrosion by ozone could be substituted. The first conduit 26 extends from flange 30 to a reducer 32 at the top of side 14. The bottom portion thereof above elbow 24 comprises a venturi 34 formed by a length of relatively small diameter pipe compared with the portion of the conduit above.

An ozone inlet injector 36 is positioned on the venturi for admitting ozone into the water within loop 12. In this particular example a ¾" Mazzei injector is used, but others could be substituted depending on such factors as the flow rate. An expander connection 38 connects the venturi to pipe 40 above which, as stated, has a diameter larger than the venturi. A foramenous plate 42 extends across the interior of pipe 40 above the expander connection 38. The plate 42 has a plurality of openings 44 therethrough.

An elbow 46 is connected to the top of pipe 40 and connects side 14 of the loop with top 20 thereof. Reducer 32 is located within the upper end of the elbow and is funnel-shaped. The reducer fits tightly within the interior of the elbow to connect it with smaller diameter second conduit 48. There is however a passageway 50 in the reducer 32 which communicates with the interior of third conduit 52. In this embodiment third conduit 52 extends about the conduit 48 and spaced - apart therefrom.

The second conduit 48 extends across top 20 of the loop to elbow 54 which is connected to a vertical portion 56 of the conduit. The second conduit has an open end 58 at the bottom of vertical portion 56 which forms an outlet for the second conduit.

The third conduit 52 has an elbow 60 extending about elbow 54 of the second conduit which is connected to a vertical portion 62 of the third conduit. Portion 62 extends below outlet 58 of the second conduit and is connected to a reducer 64. It may be seen that the vertical portion 62 of the third conduit extends about the outlet 58 and upwardly therefrom.

There is an opening 66 in third conduit 52 at the top of loop 20. Opening 66 communicates with an off gas control device 68 and serves as an outlet for gas leaving the apparatus.

Reducer 64 is connected to first inlet 69 of a flow diverter 70 on the top thereof. There is a second inlet 72 at the bottom of the flow diverter which is connected to a conduit 74 for untreated water. Conduit 74 in this embodiment is provided with a pressure control valve 76 and a pressure control gauge 78. A baffle plate 80 within diverter 70 diverts the flow of untreated water towards first outlet 82 of diverter 70. There is a second outlet 84 on the side of diverter 70 opposite outlet 82 which is connected to an outlet conduit 86 for treated water. Conduit 86 is provided with a control valve 88 in this example. Outlet 82 has a flange 92 which is connected to a flange 94 on pump 22, thus closing the loop.

The materials used throughout must be resistant to corrosion or degradation caused by ozone. P.V.C., ABS plastic or 316 stainless steel are satisfactory, while aluminum, brass, steel, nylon, neoprene, PTFE and monels are not.

OPERATION AND METHOD

In operation, water to be treated enters the conduit 74 of the apparatus, typically from a drinking water supply, as indicated at arrow 92. The untreated water passes through conduit 74 and is diverted by diverter 70 towards pump 22. The pump circulates the water about loop 12, first by pumping it towards venturi 34 as indicated by arrow 94. Ozone is added to the water in venturi 34 through ozone injector 36 as illustrated by arrow 96. Above the venturi the water and ozone are forced through openings 44 in plate 42 which serves to break up the ozone into smaller bubbles and dissolve the ozone in the water.

Arrows 98 in elbow 46 illustrate a turbulent flow regime within the elbow which is induced by pumping the water at a sufficient flow rate through the elbow by pump 22. The turbulence causes a higher differential velocity between the bubbles of ozone and the water as the water swirls about in the area of turbulence. This increases the rate of mass transfer of ozone into solution with water across the boundary of the bubbles and the water.

Beyond elbow 46 the loop is bifurcated with two branches formed by second conduit 48 and third conduit 52. The reducer 32 diverts most of the flow of water and ozone from elbow 46 into the smaller conduit 48. This flow, illustrated by arrow 100, continues down the vertical portion 56 of the third conduit to its outlet 58 where the discharge of water is illustrated by arrow 102.

Passageway 50 in reducer 32 does permit a flow of water through third conduit 52 in the space between the third conduit and the second conduit as illustrated by the smaller arrows 104. This flow is brought about only by the amount of water passing through passageway 50, and therefore flows to the outlet 58 of the second conduit at a reduced linear velocity compared to the water in conduit 48.

When the water is discharged from outlet 58 of the second conduit, it normally has undissolved gaseous ozone still contained therein. It is desirable to further dissolve this ozone in the water to further 5 purify the water and to avoid waste of the ozone which requires treatment before discharging it for safety reasons. When the ozone is discharged from outlet 58, the gas is much lighter than the water and therefore 15 tends to rise in the liquid column contained in vertical portion 62 of third conduit 52 which extends about the vertical portion of the second conduit. This counterflow of ozone with respect to the flow of water in the third conduit is illustrated by arrows 106 diverging to either side and upwardly from outlet 58 and the smaller arrows 108 pointing upwardly in the third conduit. The gases, which include air with molecular oxygen as well as ozone, move upwardly. Undissolved gases eventually reach the top of the loop where they move through opening 66 to exit the apparatus as indicated by arrows 110. As the gases move upwardly from outlet 58 of the second conduit to opening 66, additional ozone is dissolved in the water.

The water in the third conduit about the second conduit moves downwardly, as shown by arrows 112, and merges with the flow of water from the second conduit, illustrated by arrow 102, and enters flow diverter 70 as illustrated by arrow 114. The majority of the water, or all of it, is then recirculated back through the loop as indicated by arrow 116 in diverter 70. However, a smaller proportion of the water, indicated by arrow 118, may be diverted into outlet conduit 86 according to demand as controlled by valve 88. Thus it may be seen that the majority of water is recirculated about the loop for further treatment to purify the water the required amount. Only a fraction of the water is removed through conduit 86 when required on a continual basis as purified water illustrated by arrow 120. The amount of untreated water 92 entering the loop is the same as the amount of treated water leaving through conduit 86 once the loop has been filled to capacity.

VARIATIONS AND ALTERNATIVES

Figure 2:
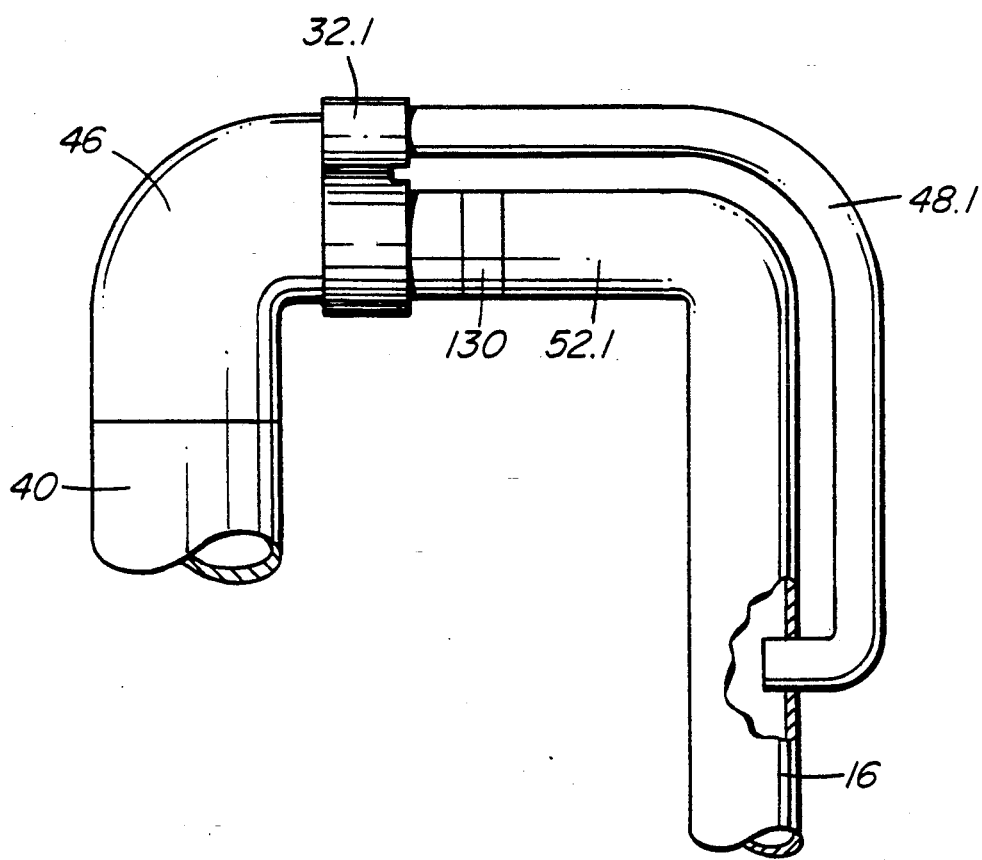
FIG. 2 is a fragmentary side elevation of an alternative embodiment thereof.

Instead of the arrangement shown in FIG. 1 where the third conduit and second conduit are concentric, other arrangement are possible. For example, as shown in FIG. 2, a Y-shaped fitting 32.1 could be used on the end of elbow 46 instead of the reducer 32. This would split the flow into two separate conduits. A restrictor 130 could be used to divert most of the flow into the second conduit 48.1, while the opening for gas would be in the third conduit 52.1. The end of the second conduit would enter the wall of the third conduit on the second side 16 in a similar position to outlet 58 in the example illustrated. Otherwise, the device would work in a similar way.

The funnel - shaped reducer 32 is preferred for diverting most of the flow into the second conduit 48. However, an annular baffle with one or more apertures 50 could be used instead.

It will be appreciated by someone skilled in the art that many of the details provided above are given by way of example only and can be modified without departing from the scope of the invention which is to be determined from the following claims.

What is claimed is:

1. An apparatus for treating water with ozone, comprising:
    a first conduit;
    a pump connected to the first conduit for pumping water therethrough;
    a passageway for admitting ozone into the first conduit;
    a second conduit having an inlet connected to the first conduit and an outlet;
    a third conduit having a vertical portion extending upwardly adjacent the outlet of the second conduit; and
    a passageway connecting the third conduit to the first conduit above the outlet of the second conduit, the passageway being sized to permit a reduced flow of water through the third conduit to the flow through the second conduit and providing means for ozone discharged from the outlet of the second conduit to rise through the vertical portion of third conduit to increase dissolving of the ozone in the water.

2. An apparatus as claimed in claim 1, wherein the apparatus forms a loop with a conduit extending from near the outlet of the second conduit to the pump.

3. An apparatus as claimed in claim 2, wherein the loop has a top, the apparatus including an outlet for gas near the top of the loop.

4. An apparatus as claimed in claim 3, wherein the loop has generally vertical sides, the vertical portion of the third conduit and the outlet of the second conduit being on one said side upstream of the pump.

5. An apparatus as claimed in claim 4, wherein the passageway for admitting ozone is on another said side downstream of the pump.

6. An apparatus as claimed in claim 1, wherein the third conduit is within the second conduit.

7. An apparatus for treating water with ozone, comprising:
    an outer conduit forming a continuous loop having a top, a bottom, a first side and a second side;
    a pump connected to the bottom of the loop for pumping water about the loop from the bottom toward the first side;
    an aperture on the outer conduit for admitting ozone into the outer conduit;
    an outlet for gases near the top of the loop;
    an inner conduit within the outer conduit and spaced - apart therefrom to form a passageway for water therebetween, the inner conduit having an inlet between the opening for admitting ozone and the outlet for gases and an outlet within the outer conduit on the second side of the loop; and
    a restrictor for diverting some water pumped by the pump into the inlet of the inner conduit and for permitting a reduced linear velocity of water through the passageway.

8. An apparatus as claimed in claim 7, wherein the loop is substantially rectangular, having generally straight, vertical portions along the sides and generally straight, horizontal portions along the top and the bottom.

9. An apparatus as claimed in claim 8, wherein the outlet of the inner conduit is between the top and the bottom of the loop.

10. An apparatus as claimed in claim 7, wherein the restrictor is a reducing connector inside the outer conduit with a passageway therethrough extending to the outer conduit downstream of the connector.

11. An apparatus as claimed in claim 8, wherein the loop has an elbow at the junction of the first side and the top and the pump has sufficient capacity to cause turbulent flow at the elbow.

12. An apparatus as claimed in claim 11, further including a foraminous member in the first side between the opening for admitting ozone and the elbow.

13. A process for treating water with ozone, comprising the steps of:
    circulating water about a continuous loop of conduit;
    admitting ozone into the conduit;
    diverting part of the flow of ozonated water out of the conduit when required; and
    adding water to the conduit to make up for the ozonated water so diverted;
    wherein the conduit has a bifurcated portion, a first branch thereof having an open end and a second branch thereof having a vertical portion which extends about the open end of the first branch, some of the water being circulated through the first branch and a portion of the water being circulated through the second branch at a lower linear velocity than the water in the first branch, free ozone released at the open end of the first branch moving upwardly through the second branch in counterflow with water therein.

14. A process as claimed in claim 13, wherein the loop has a vent near the top thereof on the second branch, the method including the step of removing waste gases through the vent.

* * * * *